United States Patent [19]

Smith et al.

[11] 4,024,889

[45] May 24, 1977

[54] DYNAMIC CONTROL VALVE FOR MODIFYING FLUID FLOW

[76] Inventors: Paul D. Smith, 721 Anita St., Redondo Beach, Calif. 90278; Phillip Mannes, 23331 Audrey St., Torrance, Calif. 90503

[22] Filed: May 14, 1974

[21] Appl. No.: 469,365

[52] U.S. Cl. .............................. 137/517; 137/855; 138/46
[51] Int. Cl.² .......................................... F16K 15/14
[58] Field of Search ............ 137/517, 525.3, 525.5, 137/521, 525, 855, 856; 138/45, 46

[56] References Cited

UNITED STATES PATENTS

| | | | |
|---|---|---|---|
| 1,667,143 | 4/1928 | De Luiz et al. | 137/525 |
| 1,768,110 | 6/1930 | Boynton | 137/521 X |
| 1,796,440 | 3/1931 | Christensen | 137/525.3 X |
| 2,684,079 | 7/1954 | Krohm | 137/525.3 X |
| 2,793,649 | 5/1957 | Hamel | 137/517 X |
| 2,943,638 | 7/1960 | Prucha | 137/525 X |
| 3,057,373 | 10/1962 | Bragg | 137/525.3 X |
| 3,380,474 | 4/1968 | Mills | 137/517 |
| 3,523,559 | 8/1970 | Gibson | 137/517 X |
| 3,698,423 | 10/1972 | Dahlquist et al. | 137/525 X |

Primary Examiner—William R. Cline

[57] ABSTRACT

A fluid flow control valve comprising a substantially cylinder-shaped body for insertion in a tube or pipe, said body having an annular recess therearound for the reception of a resilient O-ring to effect a seal between said body and the inner surface of said tube or pipe, one end of said body having a rectangular recess thereacross and a reed athwart said rectangular recess, said body having an orifice therethrough, one end of which opens into said rectangular recess, said reed having an opening therethrough to pass a threaded member, said member having a head thereon for engaging said reed and holding it firmly against said body.

5 Claims, 3 Drawing Figures

DYNAMIC CONTROL VALVE FOR MODIFYING FLUID FLOW

SUMMARY OF THE INVENTION

A fluid flow control valve comprising a cylinder-shaped body having an annular recess for a resilient O-ring to effect a seal between said body and the pipe through which the fluid passes, the face of said body having a rectangular recess thereacross, and a reed athwart said rectangular recess, said body having an orifice therethrough opening into said rectangular recess, and means for holding said reed against said face.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

DESCRIPTION OF PREFERRED EMBODIMENTS said control element is flat having its mid-section portion parallel to said recess under a condition of no fluid flow of said working fluid through said conduit being deflectable at said mid-section in response to variations of said working fluid flow pressure to dimensionably modify a fluid flow area defined between said control element mid-section portion and said passageway orifice whereby said dimensional area modifications directly influence the conduction of said working fluid flow passing through said fluid flow area between said control element and said passageway orifice.

An orifice 14 extends all the way through the body from the recess 13, which is preferably milled in the face of the body. A reed 15 overlies this recess, the end 21 of the reed extending only a relatively short distance beyond the recess 13.

Figure 1:
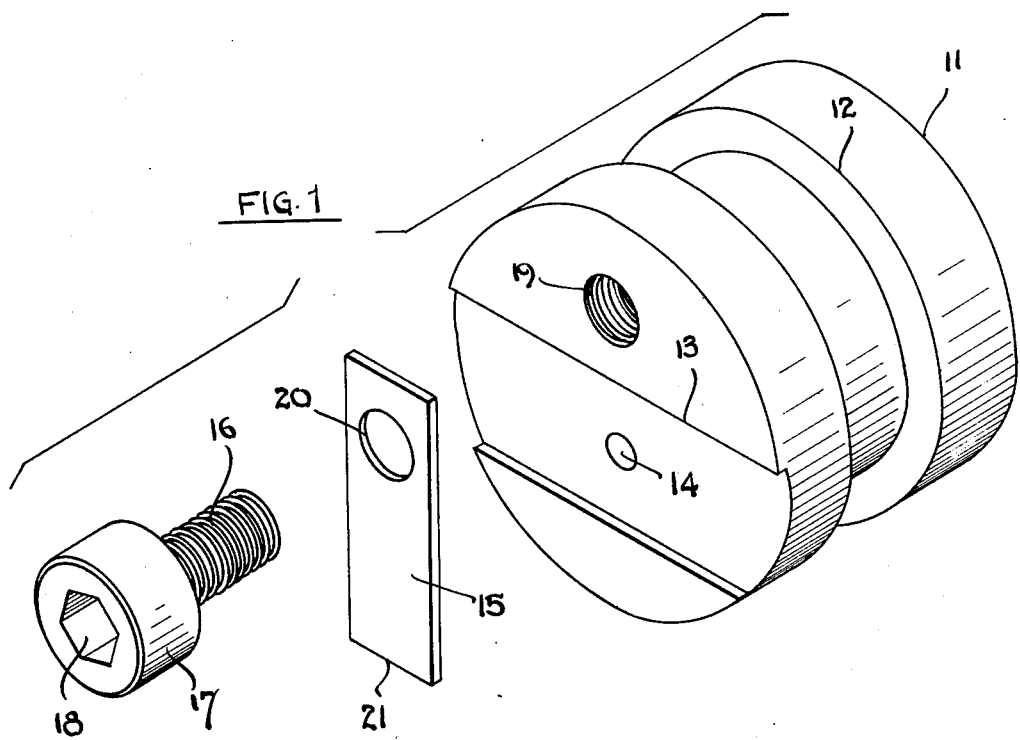
FIG. 1 is an exploded view of the liquid flow valve.
Figure 2:
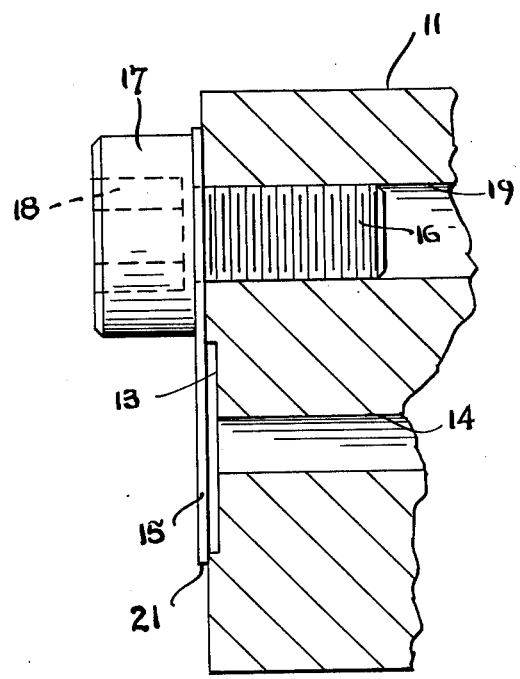
FIG. 2 is a side elevation of the valve, partly broken away, showing the orifice that opens into a rectangular recess on the top or front end of the body of the valve, the reed that overlies the central portion of the rectangular recess, and the threaded member that holds the reed in position.
Figure 3:
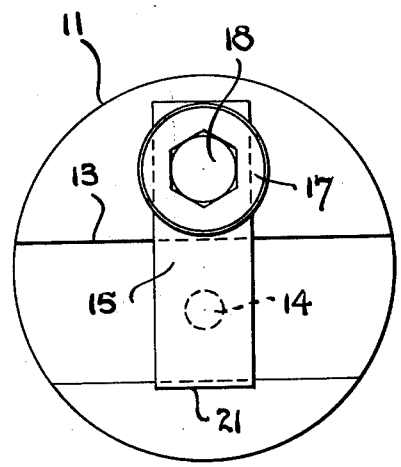
FIG. 3 is a top or front view of the valve, showing the orifice in phantom, and the keyed knob of the threaded member that presses against the reed.

The face of the valve body has a hole therein symmetrically disposed with respect to the two ends of the recess 13, as shown in FIG. 1. The reed 15 has a hole 20 therein of sufficient size to permit the threaded portion of the member 16 to pass therethrough and be threaded into the female threads in the hole 19. When member 16 is screwed tightly into this hole, the shoulder of the head 17 holds the reed firmly in position over the recess 13. The keyed opening 18 in the head 17 permits member 16 to be turned by means of a wrench keyed to fit the keyed opening.

The control valve will perform the following functions; limit the total fluid flow, modulate the flow rate commensurate with the pressure applied, and shut off the flow when required.

As examples of a flow control valve, the active flow control element is the reed 15 that bridges a recess 13 on the upstream side of the device. Orifice 14 is located in the recess face under the reed. The orifice and recess are proportioned so that the reed senses an increasing pressure drop with increasing flowrate and deflects toward the face of the recess and decreases the flow area between the reed and orifice face. Depending upon whether the fluid is a liquid or a gas, and the Reynolds Number of the flow, the relationship of flowrate with presssure drop across the reed may be approximately linear or exponential. For a liquid the flowrate typically varies as the square root of pressure drops. Reed deflection toward the recess face is close to linear with applied load due to fluid pressure, but approximately an inverse cubic function of reed effective length, and an inverse linear function of the reed area movement of inertia. This device may be designed to decrease flowrate with increasing upstream pressure, to provide a substantially constant flowrate even though the pressure is changing, or to provide an increasing fluid flowrate with increasing fluid pressure.

If a decreasing flowrate with increasing pressure is desired while the fluid is a liquid, an approximately rectangular recess is used so as to result in a reed whose length does not vary as it deflects toward the recess face. The controlling flow area is approximately the orifice circumference time the distance from the recess face to the reed (if the initial reed to recess dimension is less than one fourth the orifice diameter). For a liquid, the flowrate varies linearly with flow area; but as the square root of pressure drop, and the flow area is decreasing linearly with pressure drop, the net result in this case will be that the flowrate will decrease with increasing pressure and eventually the device will close or shut off at a predetermined fluid pressure.

If a substantially constant flowrate is desired that does not vary with fluid pressure, a recess cross section shape is chosen wherein the effective length of the reed decreases as it is deflected by increasing fluid pressure towards the orifice. Several variations of the recess shape have been actually used in practice. One variation is a recess that is triangular in shape with rounded corners where the reed is supported. Another is more parabolic or circular in shape both with shaped rounded corners where the reed is supported. In this case, as the reed deflects, it stiffens because its effective length is decreasing. This stiffening is sufficient to compensate for the increase in pressure whereby the reed deflection and, therefore flow area, now varies as a square root function of pressure while the flowrate will remain substantially constant.

If a fluid flowrate that increases with increasing fluid pressure is desired, the recess shape and corner radii are chosen wherein the reed effective length decreases even faster with deflection than in the previously described case. The flow area therefore does not decrease sufficiently to compensate for the increase in fluid pressure and the fluid flowrate therefore increases with fluid pressure.

It will be understood that various alterations and substitutions may be made in the structure hereinbefore described without departing from the broad spirit of the invention as succinctly set forth in the appended claims.

We claim:

1. A control valve for dynamically adjusting fluid flow through a conduit comprising the combination of:

a valve body disposed in said conduit for interferring with the flow of a working fluid under pressure;

a resilient seal carried on said valve body between said valve body and said conduit to prevent fluid leakage therebetween;

said valve body having an upstream face provided with a shaped recess extending thereacross so as to divide said body face into a pair of raised body portions separated by said recess;

said valve body having at least one passageway extending through said valve body for conducting said fluid flow and said passageway having an orifice opening into said upstream face within said recess defined by said pair of raised body portions;

a deflectable control element bridging said recess and disposed over said passageway orifice so as to be in variable spaced apart relationship therewith and so as to interfere with the fluid flow into said passageway orifice;

said control element having opposite ends wherein one end is rigidly secured to one of said raised body portions and the other end is slidably disposed on said other raised body portion and wherein a mid-section portion of said control element between said opposite ends bridges across said recess immediately over said passageway orifice; and said control element being deflectable at said is flat having its mid-section portion parallel to said recess under a condition of no fluid flow of said working fluid through said conduit. portion and said passageway orifice whereby said dimensional area modifications directly influence the conduction of said working fluid flow passing through said fluid flow area between said control element and said passageway orifice.

2. The invention as defined in claim 1 wherein said control element is an elongated linear flexible reed and said recess is an elongated passageway extending normal to said flexible reed.

3. The invention as defined in claim 2 including screw means for securing a selected end of said reed to one raised body porton of valve body so that said reed is cantilevered across terminating in its other end being slidably engageable with the other of said raised body portions.

4. A fluid flow control valve comprising:

a body and a resilient seal to prevent leakage between the valve body and the conduit in which the valve is placed and through which a working fluid flow passes;

the upstream face of the valve body having a recess thereacross defined between a pair of spaced apart shoulders and a deflectable reed bridging said recess;

said body having at least one orifice therethrough opening into said body recess at said upstream face of said body below said reed in variable spaced relationship thereto;

said reed being elongated, flat and parallel to said recess at no flow conditon of said working fluid and linear and acting as a control element deflectable about its midsection in response to impingment of said working fluid flow;

said reed element being deflected with respect to said body face by variation of said working fluid flow pressure so as to change the effective flow area through said body so that by means of minor dimensional variations said valve provides a flowrate relationship operable in response to variations of working fluid pressure; and said reed fixedly secured at a selected end to a selected one of said valve body shoulders and cantilevered across said recess in slidable engagement at its opposite end with the other of said valve body shoulders defining said recess so as to maintain its location with respect to said recess and orifice.

5. The combination set forth in claim 4 in which the thickness and width of the reed is critical along its length so as to be responsive to produce a specific deflection curvature of said reed that will result in the desired relationship of fluid flow area with respect to fluid pressure variation.

* * * * *

UNITED STATES PATENT AND TRADEMARK OFFICE
Certificate

Patent No. 4,024,889                                    Patented May 24, 1977

Paul D. Smith and Phillip Mannes

Application having been made by Paul D. Smith and Phillip Mannes, the inventors named in the patent above identified, for the issuance of a certificate under the provisions of Title 35, Section 256, of the United States Code, deleting the name of Paul D. Smith as a joint inventor, and a showing and proof of facts satisfying the requirements of the said section having been submitted, it is this 31st day of January 1978, certified that the name of the said Paul D. Smith is hereby deleted from the said patent as a joint inventor with the said Phillip Mannes.

FRED W. SHERLING,
*Associate Solicitor.*